United States Patent
Moreno

(10) Patent No.: US 12,347,127 B2
(45) Date of Patent: Jul. 1, 2025

(54) METHODS AND APPARATUS FOR DETERMINING VOLUMES OF 3D IMAGES

(71) Applicant: Cognex Corporation, Natick, MA (US)

(72) Inventor: Daniel Alejandro Moreno, Northbridge, MA (US)

(73) Assignee: Cognex Corporation

( * ) Notice: Subject to any disclaimer, the term of this patent is extended or adjusted under 35 U.S.C. 154(b) by 373 days.

(21) Appl. No.: 17/316,471

(22) Filed: May 10, 2021

(65) Prior Publication Data

US 2021/0350562 A1 Nov. 11, 2021

Related U.S. Application Data

(60) Provisional application No. 63/049,839, filed on Jul. 9, 2020, provisional application No. 63/023,195, filed on May 11, 2020.

(51) Int. Cl.
 *G06T 7/62* (2017.01)
 *G06T 17/00* (2006.01)
 *G06V 20/64* (2022.01)

(52) U.S. Cl.
 CPC .............. *G06T 7/62* (2017.01); *G06T 17/00* (2013.01); *G06V 20/647* (2022.01); *G06T 2200/04* (2013.01)

(58) Field of Classification Search
 CPC ....... G06T 7/62; G06T 17/00; G06T 2200/04; G06T 2207/10028; G06T 2207/20021; G06T 7/33; G06V 20/647
 See application file for complete search history.

(56) References Cited

U.S. PATENT DOCUMENTS 10,403,037 B1 * 9/2019 Boardman ............. G06V 10/17
10,698,106 B2 * 6/2020 Chen ....................... G01S 17/89
(Continued)

FOREIGN PATENT DOCUMENTS

| CN | 110060288 A | 7/2019 |
| JP | 2019-211364 A | 12/2019 |

OTHER PUBLICATIONS

Chang et al., Object volume estimation based on 3D point cloud. IEEE, 2017 International Automatic Control Conference (CACS). Nov. 12, 2017:1-5.

(Continued)

*Primary Examiner* — Nancy Bitar
*Assistant Examiner* — Dustin Bilodeau
(74) *Attorney, Agent, or Firm* — Wolf, Greenfield & Sacks, P.C.

(57) ABSTRACT

The techniques described herein relate to methods, apparatus, and computer readable media configured to determine an estimated volume of an object captured by a three-dimensional (3D) point cloud. A 3D point cloud comprising a plurality of 3D points and a reference plane in spatial relation to the 3D point cloud is received. A 2D grid of bins is configured along the reference plane, wherein each bin of the 2D grid comprises a length and width that extends along the reference plane. For each bin of the 2D grid, a number of 3D points in the bin and a height of the bin from the reference plane is determined. An estimated volume of an object captured by the 3D point cloud based on the calculated number of 3D points in each bin and the height of each bin.

20 Claims, 19 Drawing Sheets

(56) References Cited

U.S. PATENT DOCUMENTS

| | | | | |
|---|---|---|---|---|
| 2011/0254833 A1* | 10/2011 | McDaniel | ............... | G06T 15/00 |
| | | | | 345/419 |
| 2019/0026914 A1* | 1/2019 | Hageman | ............... | G01B 11/26 |
| 2020/0066034 A1* | 2/2020 | Tham | ................... | G05D 1/0016 |
| 2020/0394813 A1* | 12/2020 | Theverapperuma | ......................... | |
| | | | | G06F 18/2431 |
| 2022/0108528 A1* | 4/2022 | Feng | ......................... | G06T 7/70 |

OTHER PUBLICATIONS

Puri et al., Recognition and volume estimation of food intake using a mobile device. IEEE, 2009 Workshop on Applications of Computer Vision (WACV). Dec. 7, 2009:1-8.

Zhang et al., Efficient feature extraction for 2D/3D objects in mesh representation. IEEE, Proceedings 2001 International Conference on Image Processing (Cat. No. 01CH37205). Oct. 7, 2001;3:935-938. 4 pages.

Zhi et al., A Method of 3D Point Cloud Volume Calculation Based on Slice Method. Atlantis Press, 2016 International Conference on Intelligent Control and Computer Application (ICCA 2016). Jan. 2016:155-158.

International Search Report and Written Opinion mailed Aug. 13, 2021 in connection with International Application No. PCT/US2021/031523.

* cited by examiner

METHODS AND APPARATUS FOR DETERMINING VOLUMES OF 3D IMAGES

RELATED APPLICATIONS

This application claims priority under 35 U.S.C. § 119(e) to U.S. Provisional Application Ser. No. 63/023,195, titled "METHODS AND APPARATUS FOR DETERMINING VOLUMES OF 3D IMAGES," filed on May 11, 2020, and U.S. Provisional Application Ser. No. 63/049,839, titled "METHODS AND APPARATUS FOR DETERMINING VOLUMES OF 3D IMAGES," filed on Jul. 9, 2020, which are herein incorporated by reference in their entirety.

TECHNICAL FIELD

The techniques described herein relate generally to methods and apparatus for machine vision, including techniques for determining volumes of 3D images, and in particular for determining approximate volumes directly from 3D point cloud images.

BACKGROUND OF INVENTION

Machine vision systems can include robust imaging capabilities, including three-dimensional (3D) imaging devices. For example, 3D sensors can image a scene to generate a set of 3D points that each include an (x, y, z) location within a 3D coordinate system (e.g., where the z axis of the coordinate system represents a distance from the 3D imaging device). Such 3D imaging devices can generate a 3D point cloud, which includes a set of 3D points captured during a 3D imaging process. However, the sheer number of 3D points in 3D point clouds can be massive (e.g., compared to 2D data of a scene). Additionally, 3D point clouds may only include pure 3D data points, and therefore may not include data indicative of relations between/among the 3D points, or other information, such as surface normal information, it can be complicated to process 3D points with no data indicative of relations among other points. Therefore, while 3D point clouds can provide a large amount of 3D data, performing machine vision tasks on 3D point cloud data can be complicated, time consuming, require significant processing resources, and/or the like.

SUMMARY OF INVENTION

In accordance with the disclosed subject matter, apparatus, systems, and methods are provided for improved machine vision techniques, and in particular for improved machine vision techniques that can quickly and efficiently determine approximate volumes of shapes captured in 3D point cloud images.

Some aspects relate to a computerized method for determining an estimated volume of an object captured by a three-dimensional (3D) point cloud. The method include receiving data indicative of a 3D point cloud comprising a plurality of 3D points and a reference plane in spatial relation to the 3D point cloud, configuring a 2D grid of bins along the reference plane, wherein each bin of the 2D grid comprises a length and width that extends along the reference plane, determining, for each bin of the 2D grid, a number of 3D points in the bin and a height of the bin from the reference plane, and calculating, based on the calculated number of 3D points in each bin and the height of each bin, an estimated volume of an object captured by the 3D point cloud.

According to some examples, determining the number of 3D points and height of each bin of the 2D grid includes determining, for each bin of the 2D grid a first number of 3D points in the bin on a first side of the reference plane and a first height of the bin from the first side, and calculating the estimated volume of the object comprises calculating a first estimated volume of the object. The method can include determining, for each bin of the 2D grid, a second number of 3D points in the bin on a second side of the reference plane opposite the first side, and a second height of the bin from the second side, and calculating a second estimated volume of the object. Calculating the estimated volume can include adding the first estimated volume and the second estimated volume.

According to some examples, determining the number of 3D points of each bin can include ignoring 3D points of the plurality of 3D points within a threshold distance of the reference plane.

According to some examples, calculating the estimated volume of the object based on the determined number of 3D points in each bin and the height of each bin includes calculating, based on the 3D points in each bin, a mean number of 3D points in the bins of the 2D grid. The method can include, for each bin of the 2D grid, determining, based on a number of 3D points in the bin and the mean number of 3D points in the bins, a fill weight of the bin, determining a mean height of the 3D points in the bin from the reference plane, and calculating the estimated volume based on the fill weight of each bin and the mean height of each bin. Calculating the estimated volume can include calculating an estimated volume of each bin by computing the product of (a) the fill weight of the bin, (b) the mean height of the 3D points of the bin, and (c) the common area of the bins of the 2D grid, and summing the estimated volume of each bin to compute the estimated volume of the object.

According to some examples, the method includes orienting the point cloud based on the reference plane. Orienting the point cloud based on the reference plane can include determining a reference direction of the reference plane, and aligning an axis of a coordinate system of the 3D point cloud with the reference direction. Aligning the axis of the coordinate system of the 3D point cloud to the reference direction of the reference plane can include determining a transform that maps the axis to the reference direction, and mapping, using the transform, the 3D points of the point cloud to the reference plane. The axis can be a Z axis, and the method can further include determining, for each bin, the height of the bin based on the Z axis value for each of the 3D points in the bin.

According to some examples, the method includes receiving data indicative of a desired resolution of the estimated volume, and determining the length and width of the bins of the 2D grid based on the desired resolution.

Some aspects relate to a non-transitory computer-readable media comprising instructions that, when executed by one or more processors on a computing device, are operable to cause the one or more processors to execute the method of any of the techniques described herein.

Some aspects relate to a system comprising a memory storing instructions, and a processor configured to execute the instructions to perform the method of any of the techniques described herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
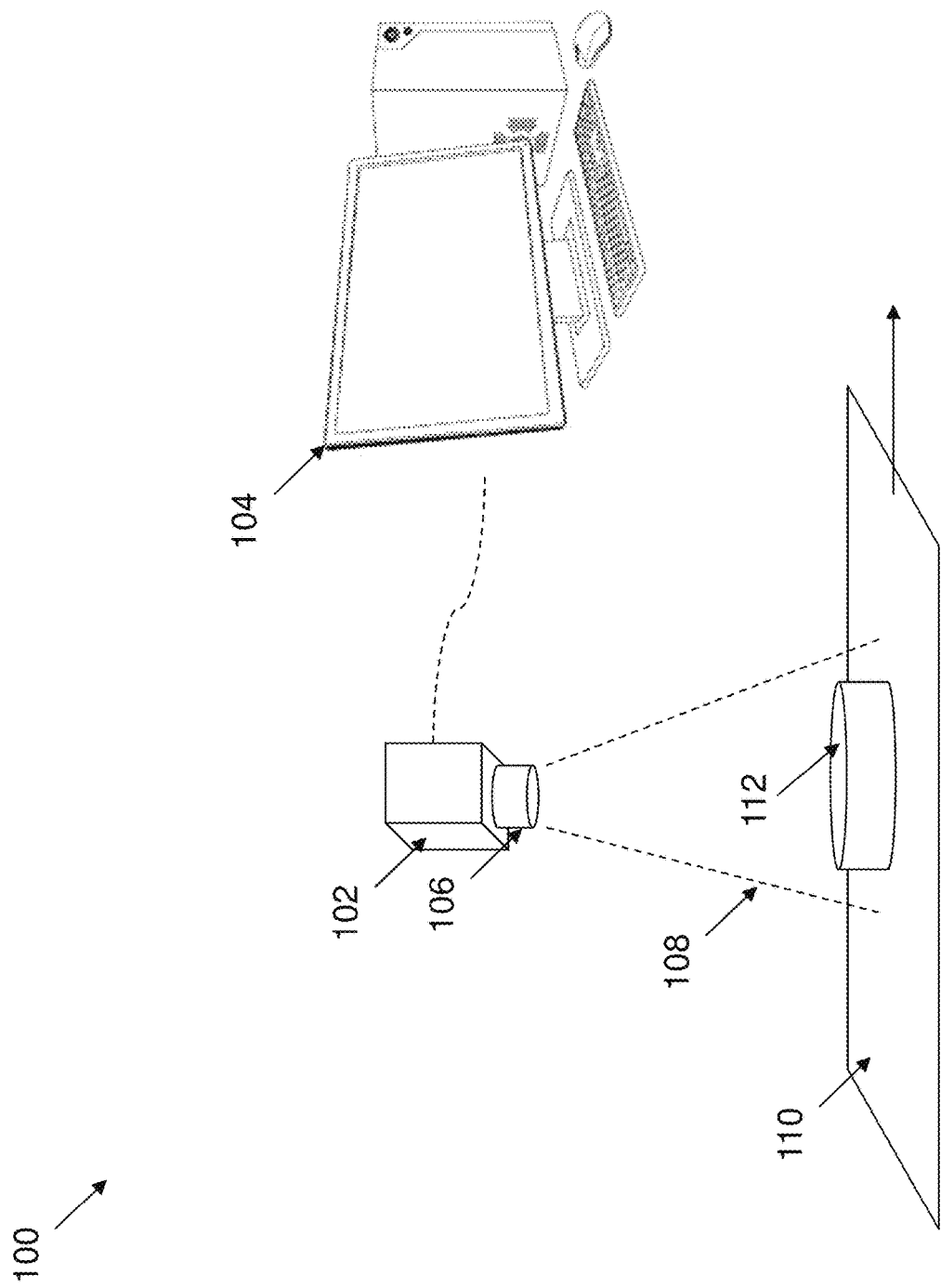
FIG. 1 shows an exemplary machine vision system, according to some embodiments.

The techniques described herein provide for quickly approximating the volume of an object captured in a 3D point cloud image. The inventors have appreciated that conventional machine vision techniques may suffer from significant inefficiencies when using traditional 3D point cloud data. 3D point clouds often include hundreds of thousands or millions of points. Therefore, the inventors have appreciated that trying to directly compute aspects of a 3D point cloud image, such as computing a volume, using such a massive number of 3D points in space can therefore be incredibly complex and time consuming. For example, since 3D point clouds include such massive numbers of 3D points and typically do not include information about spatial relationships among 3D points (e.g., and therefore do not have a volume, per se), trying to compute a volume from a pure 3D point cloud can be infeasible for many machine vision applications, which may have limited time to perform such interpretations, limited hardware resources, and/or the like. Additionally, or alternatively, 3D point clouds often only contain a partial view of the scene with some surfaces visible (e.g. a top view) and other surfaces partially and/or wholly missing (e.g. occluded side walls, missing bottom walls, etc.). Since some surfaces may be missing, conventional techniques may not be able to determine a volume for objects in such 3D point clouds.

The inventors have developed technological improvements to machine vision techniques to address these and other inefficiencies. The techniques described herein can quickly compute a volume directly from a point cloud (e.g., the point cloud created directly by a 3D sensor). Some embodiments can use a reference shape, such as a base plane, to compute the volume with respect to the reference shape. The techniques can leverage a grid of 2D bins disposed with respect to the reference shape that are used to approximate the volume within the 3D point cloud. The techniques described herein can significantly increase the speed at which a volume can be computed for a 3D point cloud compared to traditional techniques. For example, by making some assumptions about the scene using the reference object, the techniques can compute an approximate volume that is sufficiently accurate to meet the needs of machine vision applications. The approximate volume computed according to the techniques described herein can be used in place of other complex volume computations for various machine vision applications, including object detection, analysis, inspection, and/or the like. Further, by using a reference shape, the reference shape can be used to compute volumes when otherwise one or more surfaces of the object captured in the 3D point cloud are missing.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary machine vision system 100, according to some embodiments. The exemplary machine vision system 100 includes a camera 102 (or other imaging acquisition device) and a computer 104. The computer 104 includes one or more processors and a human-machine interface in the form of a computer display and optionally one or more input devices (e.g., a keyboard, a mouse, a track ball, etc.). Camera 102 includes, among other components, a lens 106 and a camera sensor element (not illustrated). The lens 106 includes a field of view 108, and the lens 106 focuses light from the field of view 108 onto the sensor element. The sensor element generates a digital image of the camera field of view 108 and provides that image to a processor that forms part of computer 104. As shown in the example of FIG. 1, object 112 travels along a conveyor 110 into the field of view 108 of the camera 102. The camera 102 can generate one or more digital images of the object 112 while it is in the field of view 108 for processing, as discussed further herein. In operation, the conveyor can contain a plurality of objects. These objects can pass, in turn, within the field of view 108 of the camera 102, such as during an inspection process. As such, the camera 102 can acquire at least one image of each observed object 112.

In some embodiments, the camera 102 is a three-dimensional (3D) imaging device. As an example, the camera 102 can be a 3D sensor that scans a scene line-by-line, such as the DS-line of laser profiler 3D displacement sensors available from Cognex Corp., the assignee of the present application. According to some embodiments, the 3D imaging device can generate a set of (x, y, z) points (e.g., where the z axis adds a third dimension, such as a distance from the 3D imaging device). The 3D imaging device can use various 3D image generation techniques, such as shape-from-shading, stereo imaging, time of flight techniques, projector-based techniques, and/or other 3D generation technologies. In some embodiments the machine vision system 100 includes a two-dimensional imaging device, such as a two-dimensional (2D) CCD or CMOS imaging array. In some embodiments, two-dimensional imaging devices generate a 2D array of brightness values. In some embodiments, a machine vision system processes the 2D data, such as by generating a two-dimensional gradient field image. The gradient field image can include, for example, a set of cells with associated magnitudes and directions. For example, the gradient field can include the Cartesian components of the vector (x, y), which can imply the magnitude and direction, the gradient field can store the actual (r, theta) values, and/or the like.

In some embodiments, the machine vision system processes the 3D data from the camera 102. The 3D data received from the camera 102 can include, for example, a point cloud and/or a range image. A point cloud can include a group of 3D points that are on or near the surface of a solid object. For example, the points may be presented in terms of their coordinates in a rectilinear or other coordinate system. In some embodiments, other information, such a mesh or grid structure indicating which points are neighbors on the object's surface, may optionally also be present. In some embodiments, information about surface features including curvatures, surface normal, edges, and/or color and albedo information, either derived from sensor measurements or computed previously, may be included in the input point clouds. In some embodiments, the 2D and/or 3D data may be obtained from a 2D and/or 3D sensor, from a CAD or other solid model, and/or by preprocessing range images, 2D images, and/or other images.

Examples of computer 104 can include, but are not limited to a single server computer, a series of server computers, a single personal computer, a series of personal computers, a mini computer, a mainframe computer, and/or a computing cloud. The various components of computer 104 can execute one or more operating systems, examples of which can include but are not limited to: Microsoft Windows Server™; Novell Netware™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random access memory (RAM); and a read-only memory (ROM).

Described herein are computerized techniques for fast computation of an estimated or approximate volume of a shape captured by a 3D point cloud. According to some embodiments, the machine vision system selects a reference direction and rotates the 3D image based on the reference direction. For example, the reference direction can be specified with respect to a reference object (e.g., a direction orthogonal to a reference plane, such as a conveyor belt), and the machine vision system can rotate the 3D image to align with the reference direction. The machine vision system configures a 2D grid of bins based on the reference direction. The machine vision system computes the number of points in each bin and the average height of each bin based on those points. The machine vision system computes the mean number of points in all of the bins and uses the determined mean number of points to normalize the number of points in each bin to determine a weight for each bin. The machine vision system estimates the volume as the aggregate of the volumes of each bin, where the volume of each bin is computed based on the weight and average height of the bin.

Figure 2:
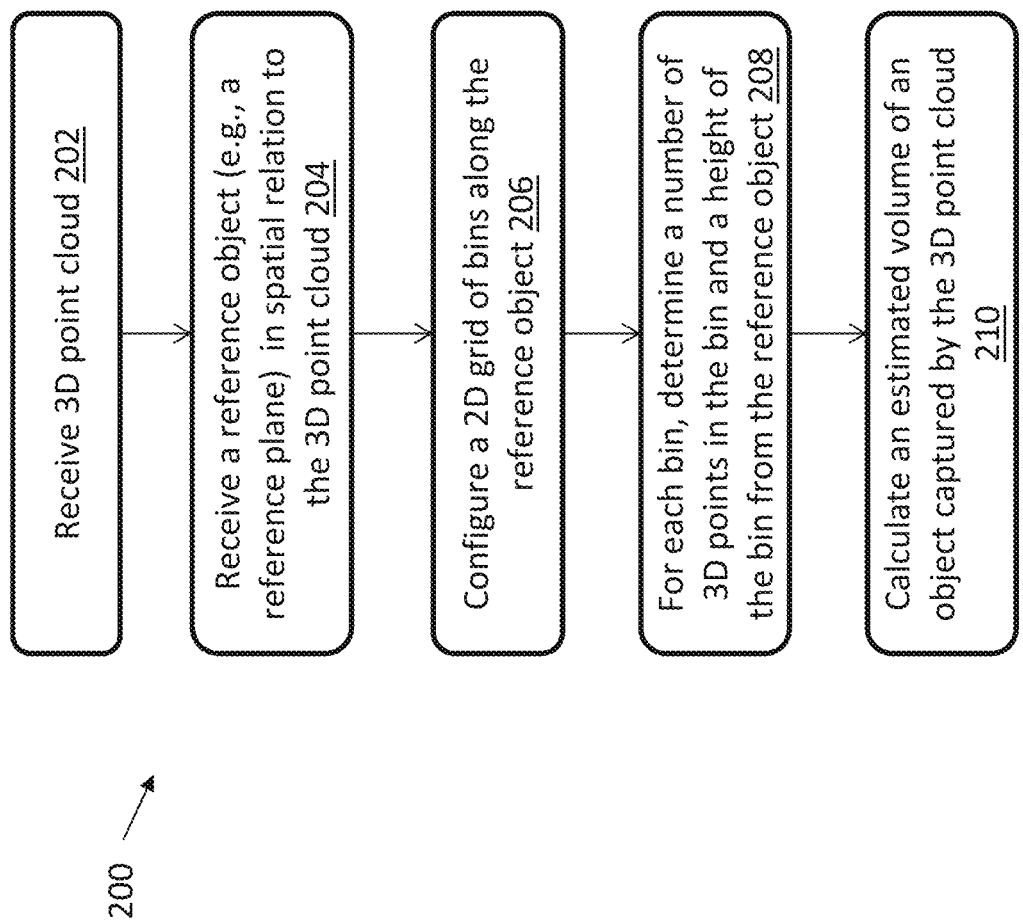
FIG. 2 is a flow chart showing an exemplary computerized method for determining an estimated volume of an object captured by a 3D point cloud, according to some embodiments.
Figure 3:
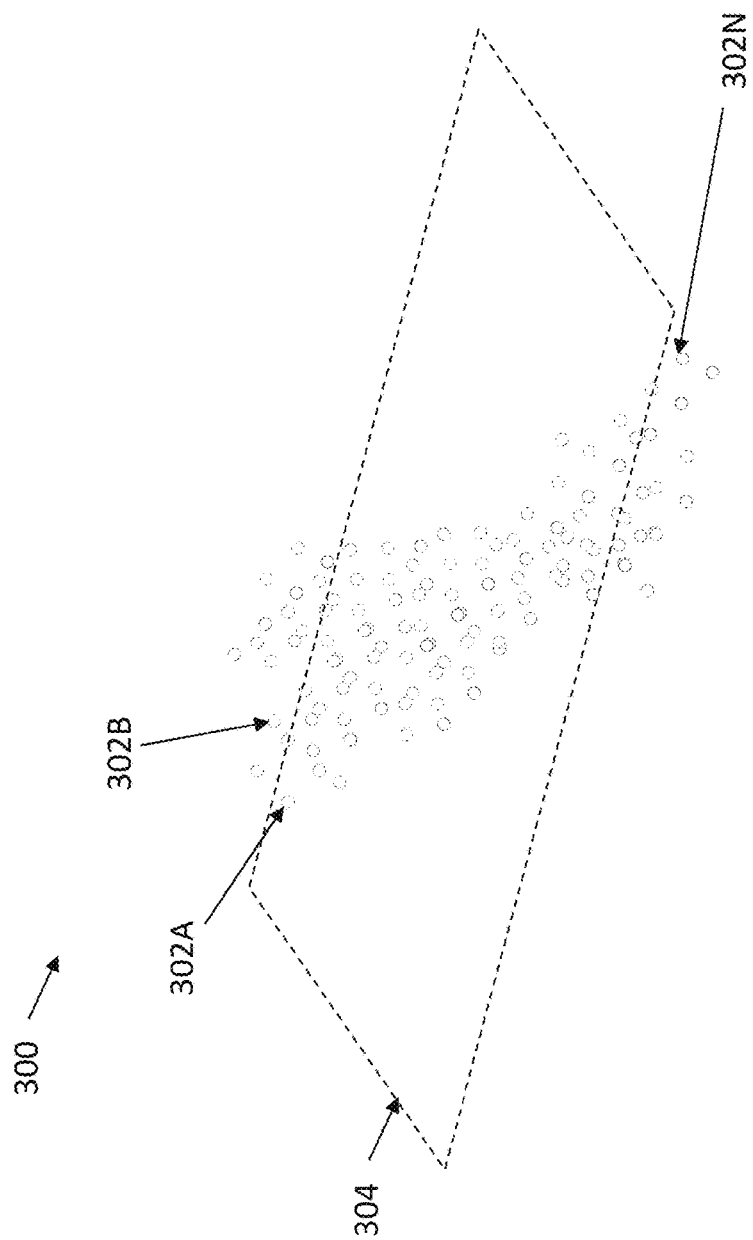
FIG. 3 is a diagram showing an example of a 3D point cloud, according to some embodiments.

FIG. 2 is a flow chart showing an exemplary computerized method for determining an estimated volume of an object captured by a three-dimensional (3D) point cloud, according to some embodiments. At step 202, the machine vision system (e.g., the machine vision system 100 of FIG. 1) accesses (e.g., receives) a 3D point cloud that has a plurality of 3D points. According to some embodiments, the 3D point cloud can be a voxel grid, a 3D lattice, and/or the like. FIG. 3 is a diagram showing an example of a 3D point cloud 300, according to some embodiments. For illustrative purposes, the 3D point cloud 300 only shows a small number of 3D points 302A, 302B, through 302N, collectively referred to as 3D points 302.

At step 204, the machine vision system receives a reference object, such as a reference plane that is specified in spatial relation to the 3D point cloud. Referring further to FIG. 3, FIG. 3 shows the outline of a plane 304 to represent a reference plane. It should be appreciated that the 3D point cloud 300 does not include information indicating the reference plane 304. Rather, the 3D point cloud 300 just includes data of the 3D points 302, and may not even include (and typically does not include) data indicating relations among the 3D points 302 themselves. For example, the 3D point cloud 300 may simply include the (x, y, z) position of each 3D point 302 in the 3D point cloud 300. The point cloud shown in FIG. 3 will be used to provide examples of the techniques described herein. It should be appreciated, therefore, that the techniques are not intended to be limited by these examples.

According to some embodiments, the 3D point cloud may be presented in terms of their coordinates in a rectilinear or other coordinate system that is associated with the 3D point cloud. In some embodiments, the techniques may orient the point cloud based on the reference object (e.g., since the axes of the coordinate system may not align with the direction(s) of the plane). Orienting the point cloud may include, for example, determining a reference direction of the reference plane (e.g., a vertical direction orthogonal to the plane, such as a conveyor belt), and aligning an axis of the coordinate system of the 3D point cloud (e.g., the X, Y or Z axis) with the reference direction. For example, the machine vision system can map the Z axis of the coordinate system to the reference direction. According to some embodiments, the system can access and/or generate a transform that can specify a mapping of the 3D point cloud coordinate system to an orientation of the reference plane. The machine vision system can determine and/or use the transform to map the 3D points of the point cloud to the reference plane.

According to some embodiments, the machine vision system determines aspects of the bins, such as the size and/or number of bins, to satisfy specific vision application requirements. The number of bins and their size can be chosen (e.g., by the machine vision system), for example, based on various factors, such as based on precision and/or speed requirements of the vision application. According to some embodiments, the larger the bin size is, the faster the techniques may run, while resulting in a coarser approximated volume. A larger bin size results in more 3D points assigned to each bin and fewer total number of bins required to cover the whole point cloud. On the contrary, for example, if the bin size is set to a (very) small value, then more bins are required to cover the same point cloud, and fewer points will be assigned to each individual bin. The increase in the total number of bins may increase the total computation time, but the computed volume will typically be finer, and more accurate, than when using larger bins. The techniques can control the speed and/or accuracy of the volume estimation by varying the bin size such that more (or fewer) 3D points are assigned to each bin, and fewer (or more) total number of bins are required to cover the whole point cloud.

For example, assume the base of each bin is a square of size 1 (e.g., as configured based on the coordinate system of the reference plane, as described further below). The techniques can control the speed and/or accuracy of the volume estimation by scaling the size of the bins such that more (or fewer) points fall in each bin. For example, if the bin size is increased (e.g., using squares of size 2, 3, etc.), such that many points fall in each bin, then fewer bins will be occupied so the techniques can run faster while the volume will be coarser. On the contrary, for example, if the bin size is reduced such that a few points fall in each bin (e.g., using squares of size 0.5, 0.25, etc.), then more bins will be occupied which can reduce the computation speed while the volume becomes more accurate.

Figure 4A:
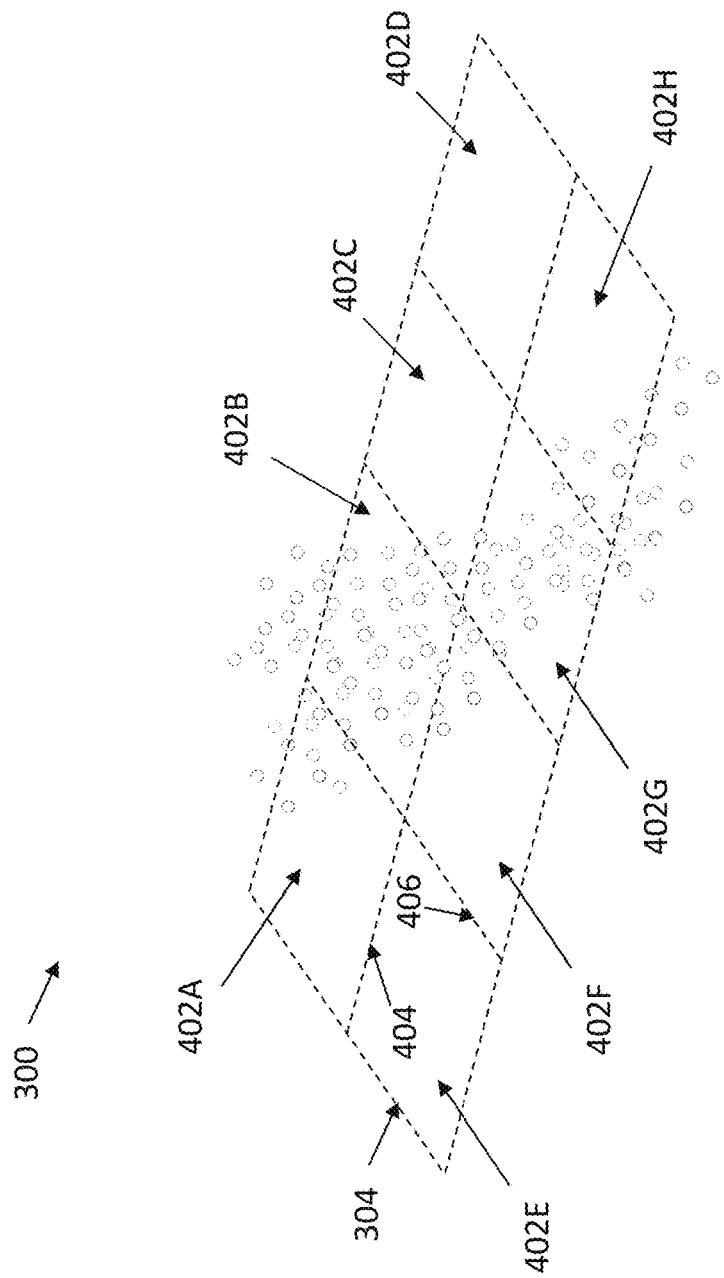
FIGS. 4A-4C show the 3D point cloud and reference plane of FIG. 3 with a 2D grid of bins, according to some embodiments.
Figure 4B:
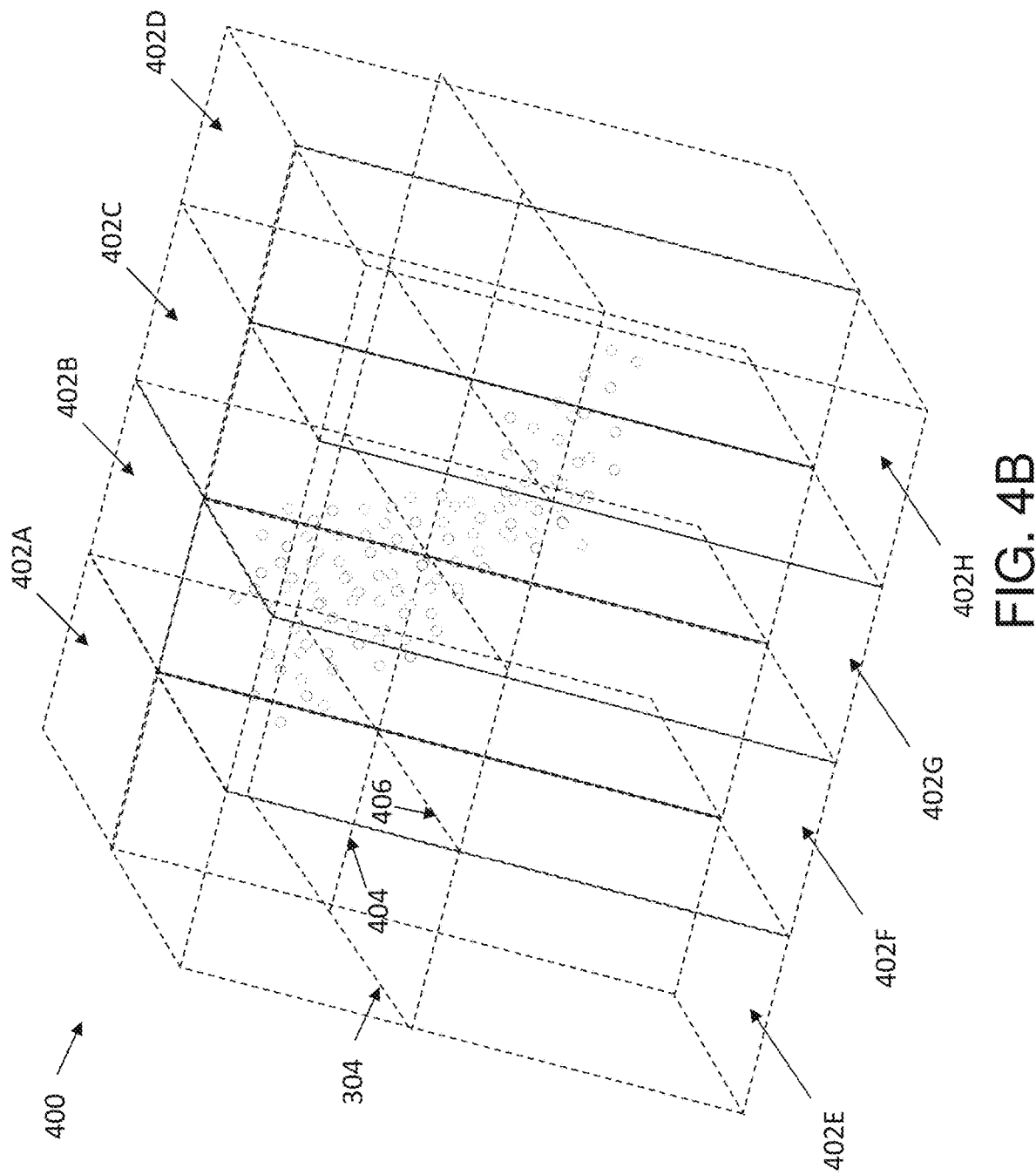
Figure 4C:
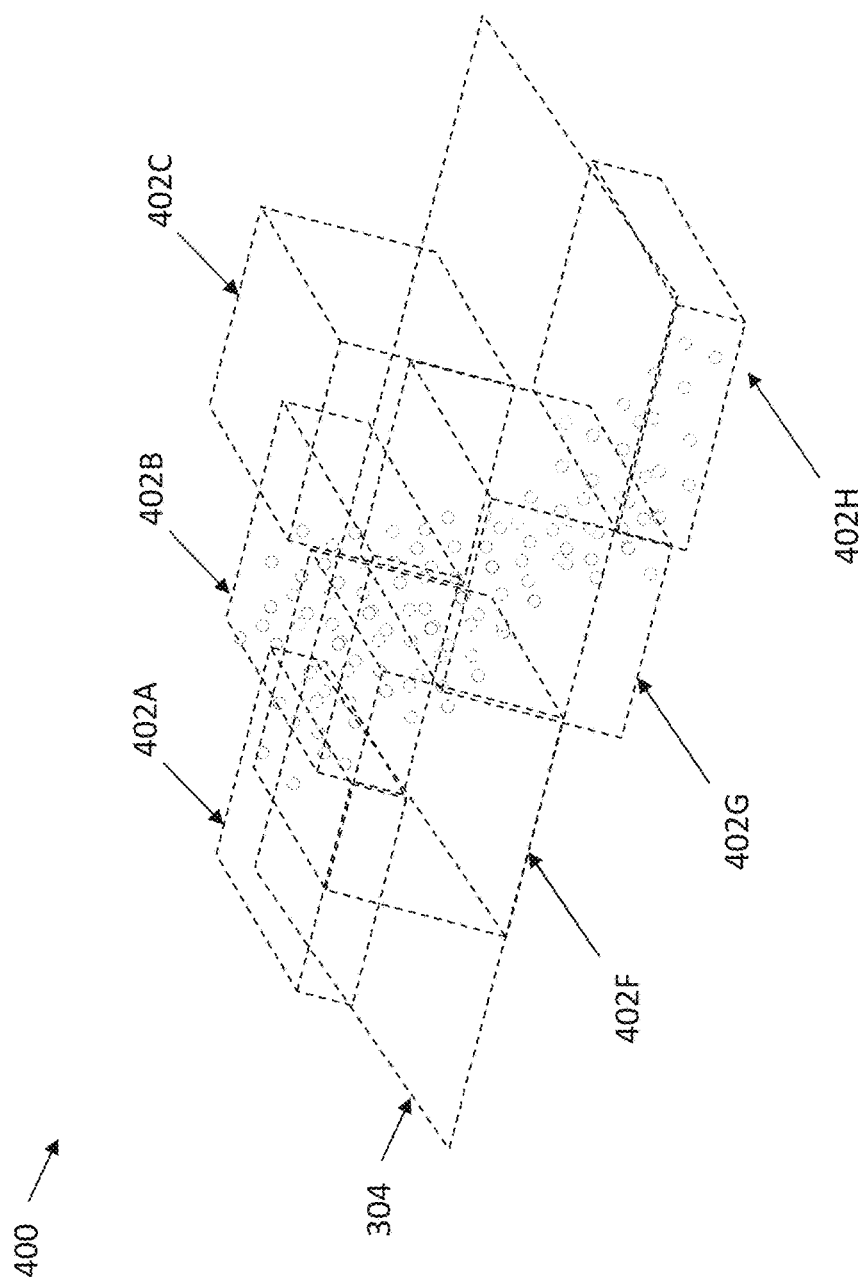

At step 206, the machine vision system configures a 2D grid of bins along the reference plane. Each bin has a length and width that extends along the reference plane. The machine vision system can configure each bin of the 2D grid with the same length and width (and the length and width may also be equal, such as in the case of a square). According to some embodiments, the scale and/or size of the bins can be selected or specified, such as via predetermined configuration data. For example, as described herein the machine vision system may access data indicative of a desired resolution of the estimated volume, and determine the size of the bins (e.g., the length and width of the bins) based on the desired resolution. FIGS. 4A-4B show the 3D point cloud 300 and reference plane 304 of FIG. 3 with a 2D grid of bins 400, according to some embodiments. In this example, the 2D grid of bins includes bins 402A, 402B, through 402H, which are collectively referred to herein as bins 402. Each bin has a same length and width (and the length and width could also be equal), with one example being shown as the length 404 and width 406 of bin 402E. FIG. 4B includes dotted lines extending from the bins 402 of the 2D grid to illustrate the three-dimensional nature of the bins with respect to the 3D points that are above and below the reference plane 304. It should be appreciated that while these dotted lines are included for exemplary purposes only, they are not intended to show a height of the bins, which can be determined as explained further herein. For example, FIG. 4C shows approximate heights of the bins, including heights for bins 402A, 402B, 402C, 402F, 402G and 402H (no heights/bins are shown for 402D and 402E due to the fact that neither bin includes 3D points).

Figure 5:
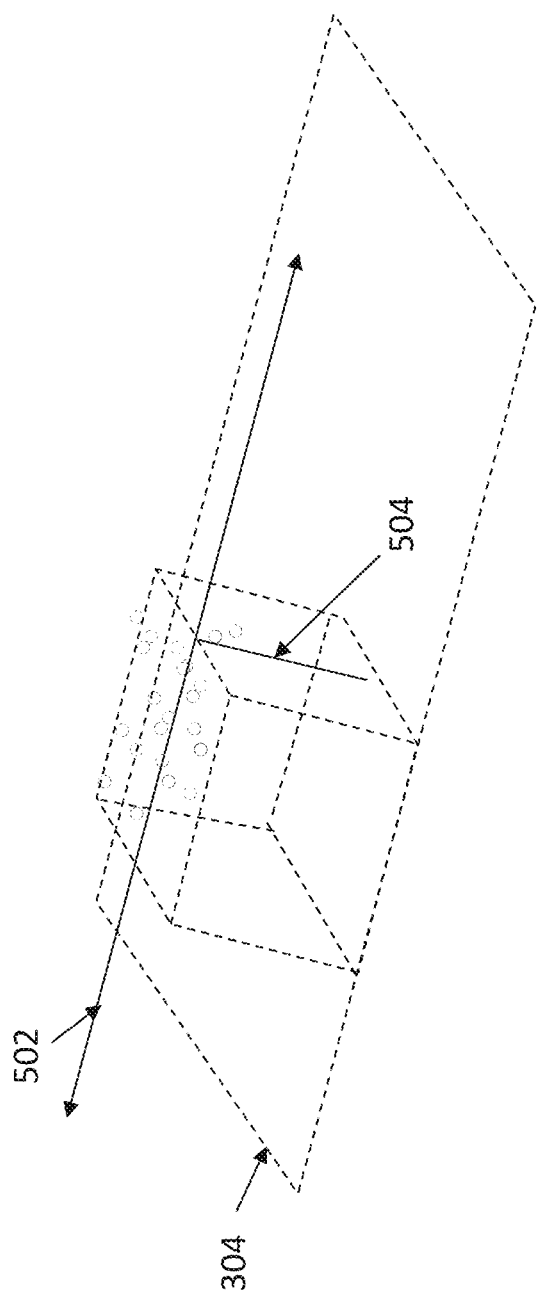
FIG. 5 is a diagram showing a bin from FIGS. 4A-4B with points on a first side of the reference plane, according to some embodiments.

At step 208, the machine vision system determines, for each bin of the 2D grid, the number of 3D points in the bin. The machine vision system also determines a height for each bin from the reference object based on the 3D points in the bin. As described herein, the 3D point cloud can be mapped to the reference plane. The height of each bin can be determined based on the mapping of the point cloud to the reference plane. For example, if the Z axis of the 3D point cloud coordinate system is mapped or oriented to a reference direction that is orthogonal to the reference plane, the machine vision system can determine the height for each bin based on the Z axis values of the 3D points in the bin. For example, the machine vision system can calculate the average Z value of each 3D point to determine and average height value for the bin. FIG. 5 is a diagram showing bin 402F from FIG. 4, according to some embodiments. Using FIG. 5 as an example to illustrate how the machine vision system processes the bins, the machine vision system determines that bin 402F includes twenty-one (21) 3D points. The machine vision system also determines a height of the bin based on those twenty-one 3D points in the bin, which is illustrated using line 502 (e.g., a mean height of the 3D points in the bin), such that the height for the bin 402F is shown as the height 504. While some embodiments compute the height by computing the mean of the height of the 3D points, it should be appreciated that other techniques can be used to compute the height. For example, the height can be computed based on a weighted average, the heights of one or more 3D points with maximum heights, the heights of one or more 3D points with minimum heights, and/or the like.

According to some embodiments, when determining the number of 3D points of each bin, the machine vision system may ignore some 3D points in the bin. For example, the machine vision system may ignore 3D points that are within a threshold distance from the reference plane (e.g., to avoid incorporating 3D points that were captured on the surface of the reference plane, if present in the scene). For example, the system can ignore points near the surface since such points likely belong to the (e.g., physical) reference plane (e.g. a conveyor belt) instead of to the object itself. In some examples, because of errors/measurement noise, these points may not be perfectly located on the reference plane, rather they may be a bit off the reference plane. Since it can be expected that the height of the object is (much) bigger than the measurement noise, the threshold value can be used to separate the points belonging to the reference shape from those belonging to the object. According to some embodiments, the value of the threshold can be chosen based on the expected measurement noise for the 3D camera, based on the range of heights of the objects being measured, and/or the like.

Figure 6:
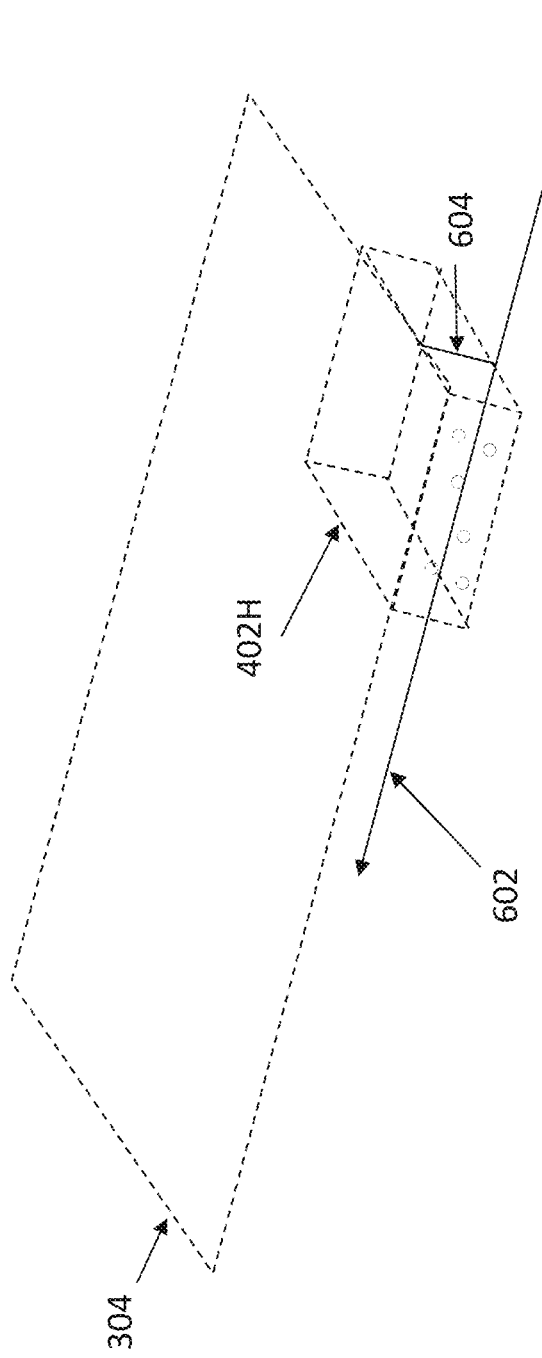
FIG. 6 is a diagram showing a second bin from FIGS. 4A-4B with points on a second side of the reference plane that is opposite the first side, according to some embodiments.

According to some embodiments, the 3D points of the 3D point cloud may be disposed on both sides of the reference plane. For example, as shown in FIG. 3, 3D points 302A and 302B are disposed on a first side of the reference plane 304 (e.g., above the reference plane 304), and point 302N is disposed on a second side of the reference plane 304 (e.g., below the reference plane 304). The techniques can include determining, for each bin, a first number of 3D points on a first side of the reference plane (e.g., and an associated height from the first side of the reference plane), and/or determining a second number of 3D points on a second side of the reference plane (e.g., and an associated height from the second side of the reference plane). FIG. 6 is a diagram showing bin 402H from FIG. 4 with 3D points on an opposite side than those of bin 402F in FIG. 5, according to some embodiments. Using FIG. 6 as an example to illustrate how the machine vision system processes 3D points of a bin on an opposite side of the reference plane 304, the machine vision system determines that bin 402H includes seven (7) 3D points. The machine vision system also determines a height of the bin from the opposite side of the reference plane based on the 3D points in the bin, which is illustrated using line 602 (e.g., determined as the mean height of the seven 3D points), such that the height for the bin 402H is shown as height 604. The machine vision system may denote points above the reference plane as positive points, and points below the reference plane as negative points. For example, if the 3D the sensor is viewing the object from above, points below the reference shape can occur when the reference shape has holes, voids, and/or other surface indents. In such examples, the techniques can measure points below the reference plane to measure the volume of the surface indents. The reference shape in such examples can be the top surface of the object being measured, and different objects may, or may not, have surface indents (e.g. due to defects), and/or may have surface indents of different sizes. As another example, the machine vision system may simply use the techniques to inspect that the hole(s) or voids have some nominal volume.

At step 210, the machine vision system calculates, based on the determined number of 3D points in each bin and the height of each bin, an estimated volume of an object captured by the 3D point cloud. According to some embodiments, the machine vision system can calculate, based on the number of 3D points in each bin, a mean or average number of 3D points in the bins of the 2D grid. The machine vision system can use the mean number of 3D points to determine a weight for each bin. For example, the machine vision system can determine a fill weight of each bin based on the number of 3D points in the bin and the mean number of 3D points in the bins. The weight of each bin can be representative of how occupied the bin is with 3D points. For example, if the number of 3D points of a bin is above the mean number of points, the machine vision system can assign the bin a weight indicative of the bin being full (e.g., a weight of 1.0). As another example, if the number of 3D points in the bin is half of the mean number of points, the machine vision system can assign the bin a weight indicative of the bin only being half occupied (e.g., a weight of 0.50). As a further example, if the number of 3D points in the bin is three quarters of the mean number of points, the machine vision system can assign the bin a weight indicative of the bin being three quarters occupied (e.g., a weight of 0.75).

The machine vision system can calculate an estimated volume of each bin by calculating an estimated volume of each bin and adding the volumes of the bins. For example, the machine vision system can calculate an estimated volume of each bin by computing the product of (a) the fill weight of the bin, (b) the mean height of the 3D points of the bin, and (c) the common/shared area of the bins of the 2D grid (e.g., the product of the length and width of the bins in the 2D grid). The machine vision can sum the estimated volume of each bin to compute the estimated volume of the object.

As described herein, there may be 3D points on opposite sides of the reference plane. The techniques can include determining, for each bin, a first volume for one side of the reference plane (e.g., a positive volume for points above the reference plane), and a second volume for the other side of the reference plane (e.g., a negative volume for points below the reference plane). For example, the machine vision system can calculate a positive volume based on the number of 3D points of each bin above the reference plane, and the determined height of each bin based on those 3D points and the first side of the reference plane. The machine vision system can use that information to determine an estimated positive volume of each bin, which can be summed to determine an estimated positive total volume, as described herein. The machine vision system can also calculate a negative volume based on the number of 3D points of each bin below the reference plane and the determined height of each bin from the opposite side of the reference plane to those 3D points. The machine vision system can likewise use that information to determine an estimated negative volume of each bin, which can be summed to determine an estimated negative total volume. According to some embodiments, the machine vision system may output both the first and second volumes, combine the first and second volumes (e.g., adding, subtracting, etc. to determine a single representative volume), and/or the like to determine the total volume.

As described herein, an estimated volume of an object can be determined based on a reference, such as a reference plane. Various techniques can be used to compute the volume of object above and/or below a plane. As an illustrative example, according to some embodiments the nominal volume of a particular bin i can be computed according to Equation 1:

$$NorninalBinVolume_i = BinBaseArea_i \times BinHeight_i \qquad \text{Equation 1}$$

Where:
BinBaseArea$_i$ is the base area of bin i with respect to the reference plane; and
BinHeight$_i$ is the height of bin i.

The weighted volume of the bin i can be computed according to Equation 2:

$$V_i = Weight_i \times NominalBinVolume_i \qquad \text{Equation 2}$$

Where:
Weight$_i$ is the determined weight of bin i; and
NominalBinVolume$_i$ is the nominal volume of bin i.

The total volume of the object can be determined based on the individual weighted volumes according to Equation 3:

$$TotalVolume = \Sigma_{i=1}^{N} V_i \qquad \text{Equation 3}$$

Figure 7:
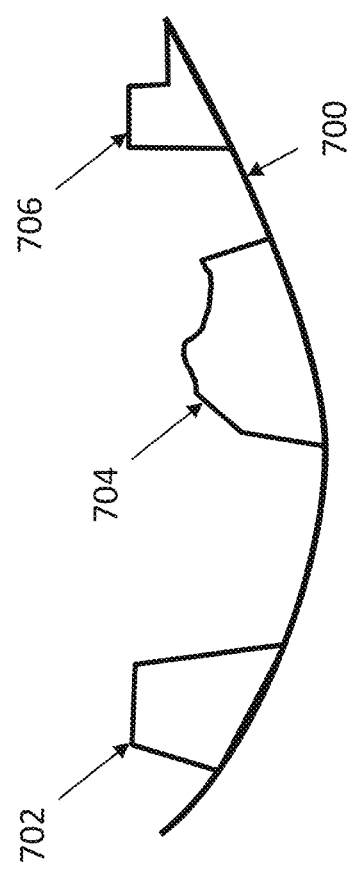
FIG. 7 is a diagram showing an exemplary curved reference pattern, on which are objects, according to some embodiments.

While a reference plane is used as an example to illustrate some aspects of the techniques described herein, it should be appreciated that other references can be used to compute the estimated volume of a shape. For example, according to some embodiments, a reference pattern can be used to measure the volume of objects sitting on non-planar surfaces. A reference pattern can be used, for example, to measure the volume above a curved surface (e.g., a curved tray). FIG. 7 is a diagram showing an exemplary curved reference pattern 700, on which are objects 702, 704 and 706. The curved reference pattern 700 can be used in conjunction with the techniques described herein to estimate the volume of the objects 702, 704 and/or 706.

Another exemplary application of a reference pattern is for an inspection application that compares newly manufactured parts against a "golden part" or template part (e.g., to detect defects). In such embodiments, the surface of the golden part is the reference pattern, and can be used to inspect runtime parts. Volume differences could be either "positive" or "negative" depending on whether the runtime part has additional material compared to the golden part, or less material, respectively. If the runtime part matches the golden part exactly, then the volume computed will be zero and/or small, (e.g., indicative of no difference between the runtime part and the golden part). An inspection application can compare the volume measurement for each runtime part with a preset tolerance value to determine if the part passes the inspection or not. For example, any positive or negative volume detected that is larger than an application set tolerance can be flagged as a potential defect.

Figure 8:
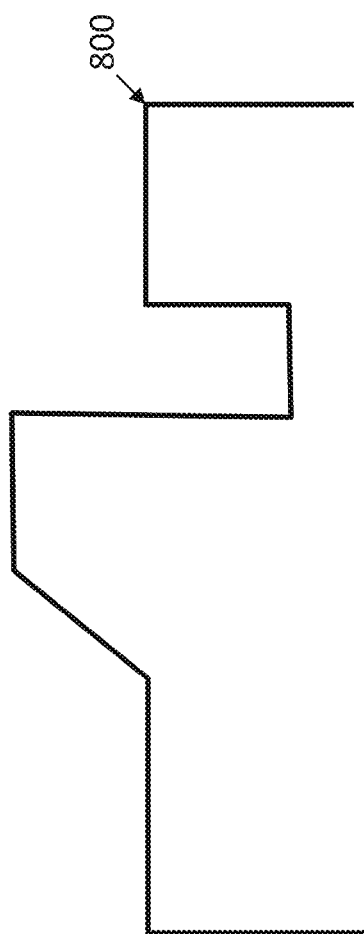
FIG. 8 is a diagram showing an exemplary surface of a portion of a reference pattern for a golden part, according to some embodiments.
Figure 9:
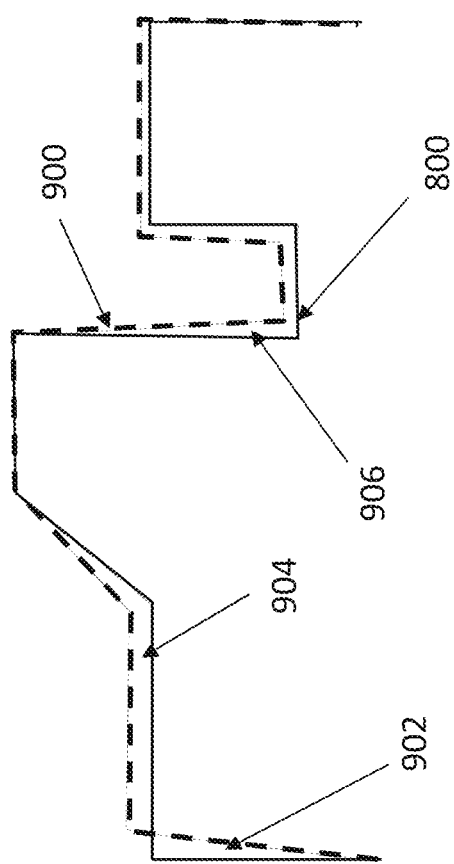
FIG. 9 is a diagram showing the surface of the reference pattern from FIG. 8 compared to a first detected surface of a first runtime part, according to some embodiments.

FIG. 8 is a diagram showing an exemplary surface 800 of a portion of a reference pattern for a golden part, according to some embodiments. FIG. 9 is a diagram showing the surface 800 of the reference pattern from FIG. 8 compared to a first detected surface 900 of a first runtime part, according to some embodiments. The techniques described herein can be used to compute differences between the surface 800 and the surface 900. In this example, the differences include a negative volume 902 and positive volumes 904 and 906. In this example, the surface 900 of the first runtime part is similar to, but not exactly equal, the surface 800 of the golden part. Since such positive and negative volumes are small deviations, the system may not classify such deviations as potentially including defects. It should be appreciated that while the surface 800 of the reference pattern in FIGS. 8-9 is a two-dimensional pattern, three-dimensional patterns can be used as the reference object to reflect three-dimensional aspects of the reference object.

Figure 10:
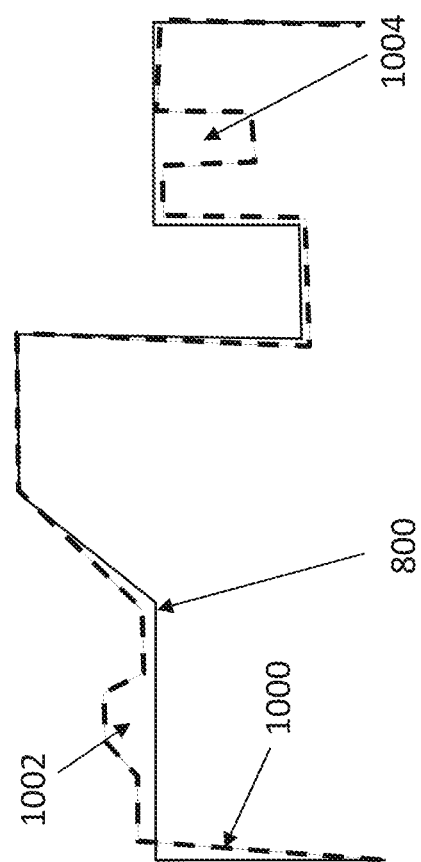
FIG. 10 is a diagram showing the surface of the reference pattern from FIG. 8 compared to a second detected surface of a second run-time object, according to some embodiments.

FIG. 10 is a diagram showing the surface 800 of the reference pattern from FIG. 8 compared to a second detected surface 1000 of a second run-time object, according to some embodiments. The techniques described herein can be used to compute differences between the surface 800 and the surface 1000. In this example, the differences include a positive volume 1002 and negative volume 1004. As shown in FIG. 10, both the positive volume 1002 and the negative volume 1004 include non-negligible deviations. Therefore, an inspection application may compare the volume of these regions to a tolerance threshold and flag the portions of the part and/or the entire part as potentially defective. As described herein, an inspection application can provide local positive and/or negative estimated volumes, global positive and/or negative estimated volumes, a combined representation of an overall volume (e.g., by adding and/or subtracting the positive and negative estimated volumes), and/or the like. In some embodiments, a graphical display can be provided to visualize positive and/or negative volumes with reference to the reference object (e.g., as shown in FIG. 10).

Figure 11:
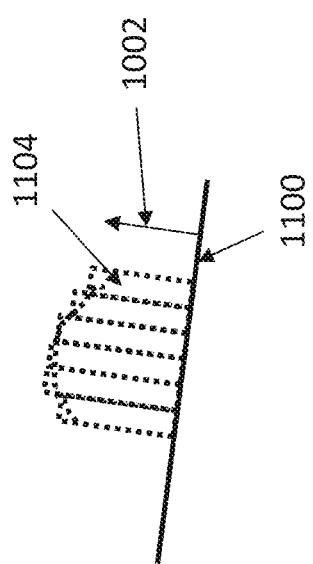
FIG. 11 is a diagram showing a reference plane with a normal vector and the bins are arranged parallel to the normal vector, according to some embodiments.
Figure 12:
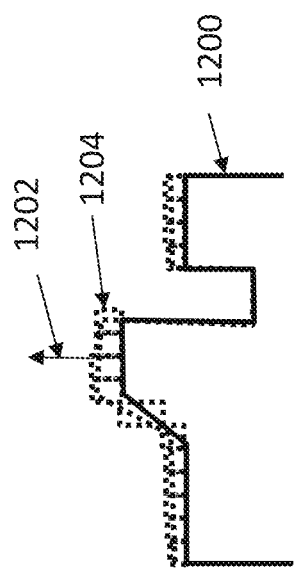
FIG. 12 is a diagram showing the pattern direction for the reference pattern, and bins created starting at the surface of the reference pattern and parallel to the pattern reference direction, according to some embodiments.

According to some embodiments, computing a volume with respect to a reference pattern can be performed using similar techniques described herein to computing volume with respect to a reference plane. When working with a plane, the techniques can use the normal vector of the plane to rotate the points and to create bins parallel to that direction. For example, as shown in FIG. 11, the reference plane 1100 has normal vector 1102, and the bins (including bin 1104) are arranged parallel to the normal vector. When working with a reference pattern, data can be provided to indicate the pattern direction, and the techniques can create bins parallel to that direction. For example, as shown in FIG. 12, the pattern direction 1202 can be provided for the reference pattern 1200, and the bins (including bin 1204) are created starting at the surface of the reference pattern 1200 and parallel to the pattern reference direction 1202.

According to some embodiments, in the case of a plane reference, the bottom face of the bins may coincide with the plane, which may not be the case when working with a reference pattern. For example, for a reference pattern, the bottom face of some and/or all bins can be made orthogonal to the reference pattern direction and its position can be determined by the mean height of the pattern at the bin position.

According to some embodiments, the bin size can be chosen based on the shape of the reference pattern. For example, if the pattern has high curvature and/or many sharp features, then small bins can be used to capture details. In some embodiments, different size bins can be used for different portion(s) of a reference pattern. For example, for portions with high curvature and/or sharp features, small bins can be used to capture details of those features, while larger bins can be used for portions with low curvature and/or soft features. As another example, if the pattern can be approximated well by a piecewise planar surface, then larger bin sizes can be used instead of smaller bin sizes. According to some embodiments, the computations for computing the height of each bin, weight of each bin, volume of each bin, and/or total volume discussed in conjunction with a reference plane can be used for reference patterns.

According to some embodiments, bins are considered "positive" and contribute to the total positive volume when they start at the pattern and extend towards points above the pattern (e.g., determined based on an upward direction of the reference pattern). Bins can be considered "negative" when they start at the pattern and extend towards points below the pattern (e.g., again, determined based on a reference direction of the reference pattern). The "upward" direction can be the pattern reference direction.

Figure 13:
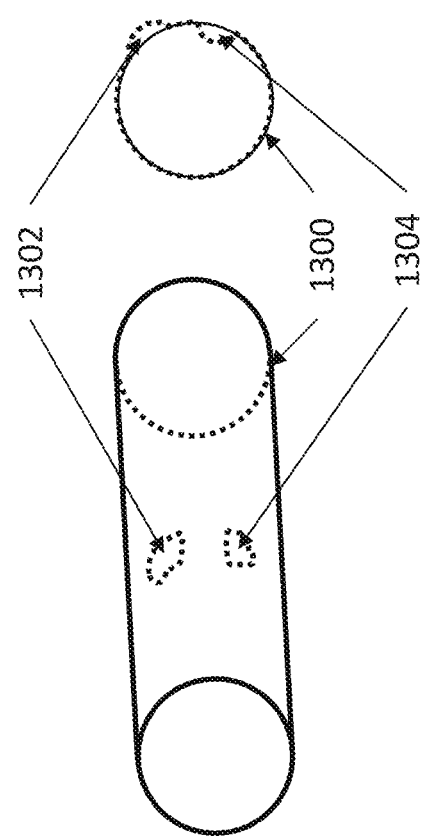
FIG. 13 is a diagram showing an example of using a reference cylinder, according to some embodiments.

According to some embodiments, a cylinder can be used as the reference for volume computation. Cylinders can be used, for example, for vision applications trying to identify bumps or depressions on cylindrically-shaped objects, such as cylindrical batteries, pipes, and/or the like. The techniques described herein can therefore be used to compute the volume of the object under inspection relative to a reference cylinder. FIG. 13 shows an example of using a reference cylinder 1300, according to some embodiments. As shown, a bump defect can result in a positive volume 1302, whereas a depression can result in a negative volume 1304.

According to some embodiments, various techniques can be used to perform the volume computation. For example, the volume can be computed with respect to a reference cylinder by transforming the points from Cartesian (x, y, z) coordinates to cylindrical (ρ, φ, z) coordinates, where ρ is the radial coordinate, φ is the azimuth, and z is the height of the cylinder. The relation between Cartesian and cylindrical coordinates can be that as provided by Equation 4:

$$\begin{cases} x = \rho\cos\phi \\ y = \rho\sin\phi \\ z = z \end{cases} \quad \text{Equation 4}$$

Figure 14:
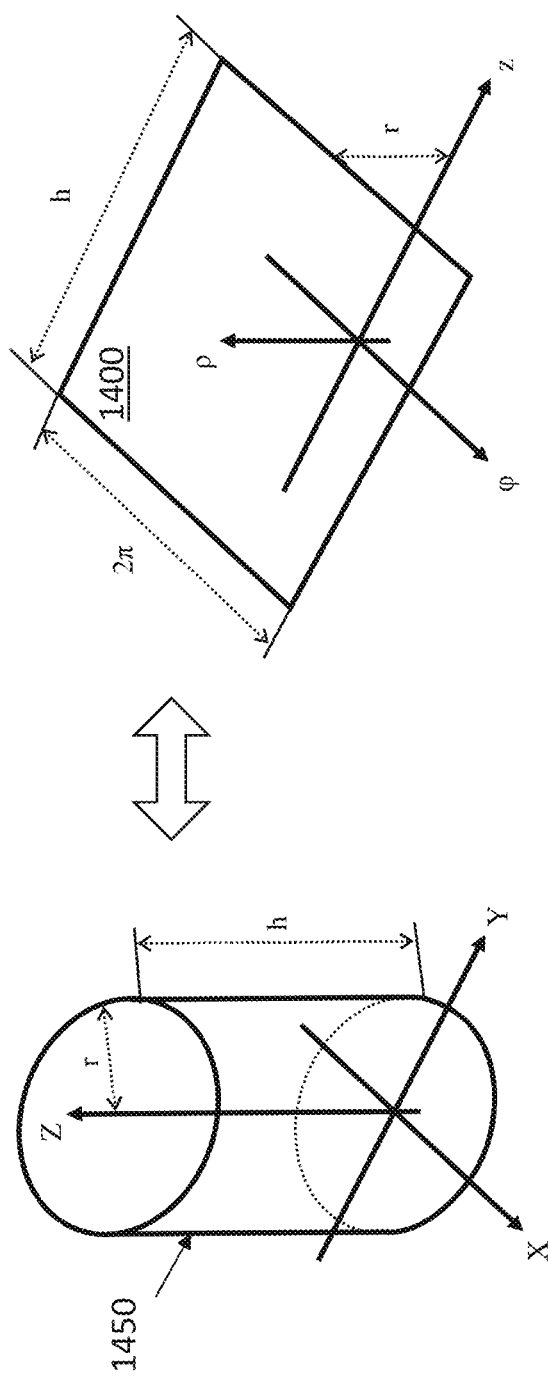
FIG. 14 is a diagram showing an exemplary rectangular region for the surface of the reference cylinder, according to some embodiments.

The relation shown in Equation 4 assumes the reference cylinder has its axis aligned with the Cartesian z-axis. If that is not the case, then a transform can be applied first to align the reference cylinder axis to the z-axis. In the space of cylindrical coordinates, the surface of the reference cylinder is a rectangular region. FIG. 14 shows an exemplary rectangular region 1400 for the surface of the reference cylinder 1450, according to some embodiments. In this example, the surface of the reference cylinder, in cylindrical coordinates, lies on the plane ρ=r. According to some embodiments, the techniques can be used to compute a volume from a reference plane to create bins of a squared base, to assign the points to bins, and to compute bin weights and heights.

Figure 15:
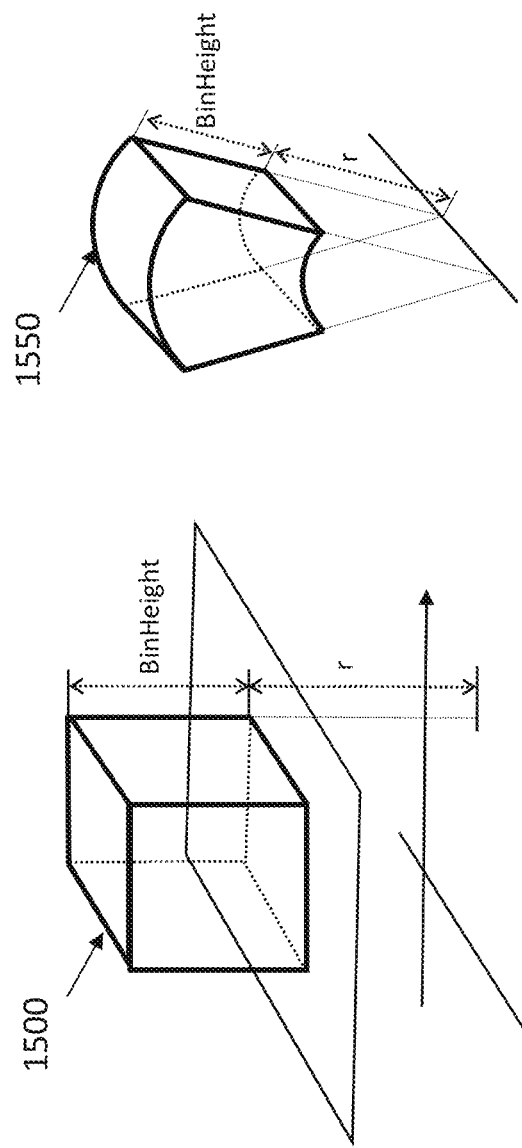
FIG. 15 is a diagram showing an exemplary bin in cylindrical coordinates and a corresponding bin in Cartesian coordinates, according to some embodiments.

The volume of individual bins can be computed according to various techniques. FIG. 15 is a diagram showing an exemplary bin 1500 in cylindrical coordinates and a corresponding bin 1550 in Cartesian coordinates, according to some embodiments. For example, the nominal volume of a positive bin i can be computed according to Equation 5:

$$NominalBinVolume_i = BinBaseArea_i \times \frac{(r + Height_i)^2 - r^2}{2} \quad \text{Equation 5}$$

Where:
$BinBaseArea_i$ is the area of bin i in cylindrical coordinates;
$Height_i$ is the (positive) height of bin i; and
r is the radius of the reference cylinder.

The nominal volume achieved by Equation 5 can be referred to as the nominal volume for a "positive bin" because bin i extends beyond the outside of the reference cylinder.

Figure 16:
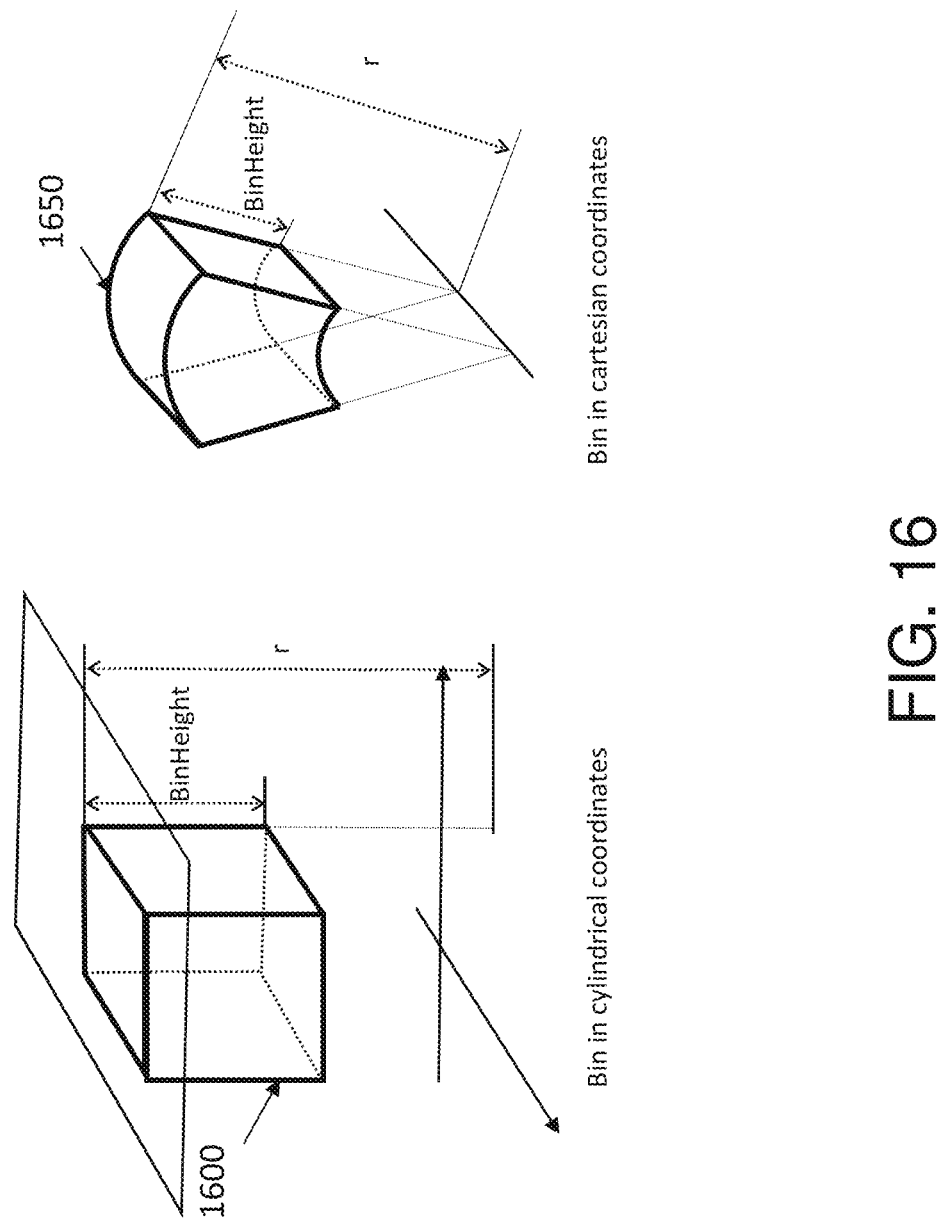
FIG. 16 is a diagram showing an exemplary negative bin in cylindrical coordinates and a corresponding bin in Cartesian coordinates, according to some embodiments.

As another example, FIG. 16 is a diagram showing an exemplary negative bin 1600 in cylindrical coordinates and a corresponding bin 1650 in Cartesian coordinates, according to some embodiments. The nominal volume of a negative bin i can be computed according to Equation 6:

$$NominalBinVolume_i = BinBaseArea_i \times \frac{r^2 - (r - Height_i)^2}{2} \quad \text{Equation 6}$$

Where:
$BinBaseArea_i$ is the area of bin i in cylindrical coordinates;
Heights is the (positive) height of bin i; and
r is the radius of the reference cylinder.

The nominal volume of Equation 6 can be referred to as the nominal volume for a "negative bin" because the bin i extends towards the inside of the reference cylinder.

According to some examples, it can be desirable for some vision applications to measure volume changes relative to spherical objects. One illustrative example is the inspection of the dimples in a golf ball. According to some embodiments, the techniques can use a reference sphere to compute the volume of an object. According to some embodiments, similar techniques can be used as described herein for a reference cylinder, but instead of using cylindrical coordinates, the techniques can use spherical coordinates. For example, the techniques can use the volume computation algorithms described herein adapted to use a reference sphere (e.g., instead of a plane or a cylinder). According to some embodiments, the techniques can transform the points to spherical coordinates, and apply the volume computation method in this transformed space. According to some embodiments, the techniques can then transform the result back to the original Cartesian coordinate space. In some embodiments, equal area bins in the space of spherical coordinates may not map to equal area sections on the surface of the reference sphere in Cartesian coordinates. To handle this, the techniques can be configured to consider the location of each bin with respect to the original spherical surface (e.g. near the poles versus near the equator) when transforming the volume computed for each bin to the original Cartesian coordinate space.

According to some embodiments, the relation between Cartesian (x, y, z) coordinates and spherical (ρ, θ, φ) coordinates, where ρ is the radial coordinate, θ is the inclination, and φ is the azimuth of the sphere, can be expressed as shown below for Equation 7:

$$\begin{cases} x = \rho \sin\theta \cos\phi \\ y = \rho \sin\theta \sin\phi \\ z = \rho \cos\theta \end{cases} \quad \text{Equation 7}$$

Figure 17:
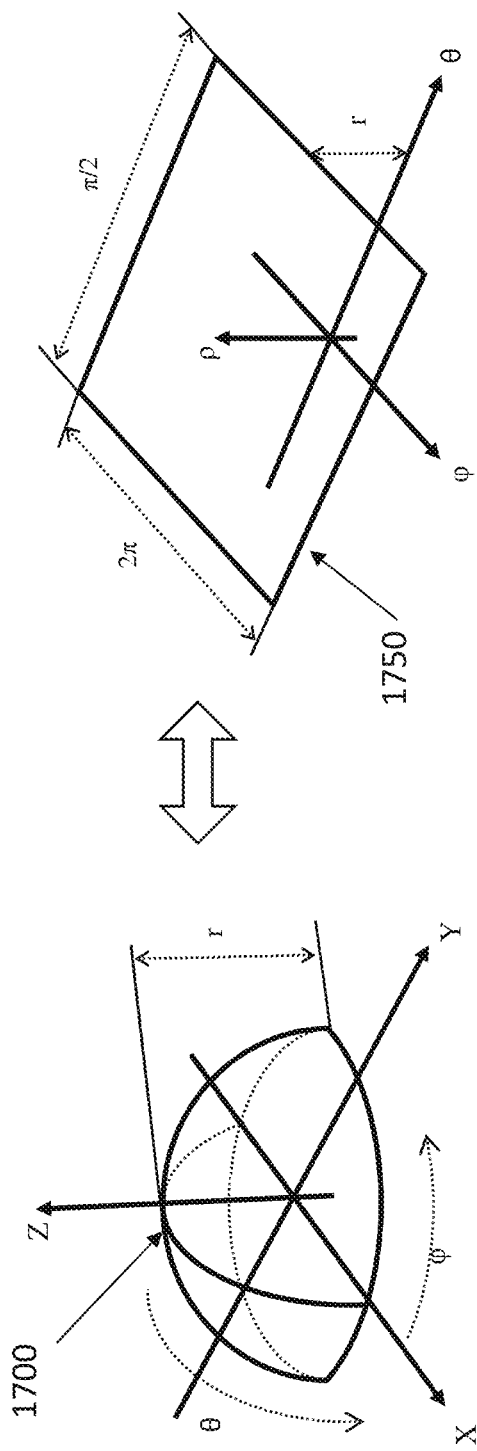
FIG. 17 is a diagram showing an exemplary semisphere in Cartesian coordinates and a corresponding semisphere in spherical coordinates, according to some embodiments.

FIG. 17 is a diagram showing an exemplary semisphere 1700 in Cartesian (x, y, z) coordinates and a semisphere 1750 in spherical (ρ, θ, φ) coordinates, according to some embodiments. In this example, the spherical coordinates have θ varying from 0 to π/2, as an example. Other examples may vary differently. For example, for a whole sphere, θ varies from 0 to π, and φ from 0 to 2π.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

Various aspects are described in this disclosure, which include, but are not limited to, the following aspects:

1. A computerized method for determining an estimated volume of an object captured by a three-dimensional (3D) point cloud, the method comprising:
  receiving data indicative of:
    a 3D point cloud comprising a plurality of 3D points; and
    a reference plane in spatial relation to the 3D point cloud;
  configuring a 2D grid of bins along the reference plane, wherein each bin of the 2D grid comprises a length and width that extends along the reference plane;
  determining, for each bin of the 2D grid, a number of 3D points in the bin and a height of the bin from the reference plane; and
  calculating, based on the calculated number of 3D points in each bin and the height of each bin, an estimated volume of an object captured by the 3D point cloud.

2. The method of 1, wherein:
  determining the number of 3D points and height of each bin of the 2D grid comprises determining, for each bin of the 2D grid:
    a first number of 3D points in the bin on a first side of the reference plane; and
    a first height of the bin from the first side; and
  calculating the estimated volume of the object comprises calculating a first estimated volume of the object.

3. The method of 2, further comprising:
  determining, for each bin of the 2D grid:
    a second number of 3D points in the bin on a second side of the reference plane opposite the first side, and a second height of the bin from the second side; and
  calculating a second estimated volume of the object.

4. The method of 3, wherein calculating the estimated volume comprises adding the first estimated volume and the second estimated volume.

5. The method of any of 1-4, wherein determining the number of 3D points of each bin comprises ignoring 3D points of the plurality of 3D points within a threshold distance of the reference plane.

6. The method of any of 1-5, wherein calculating the estimated volume of the object based on the determined number of 3D points in each bin and the height of each bin comprises:
  calculating, based on the 3D points in each bin, a mean number of 3D points in the bins of the 2D grid.

7. The method of 6, further comprising:
  for each bin of the 2D grid:
    determining, based on a number of 3D points in the bin and the mean number of 3D points in the bins, a fill weight of the bin; and
    determining a mean height of the 3D points in the bin from the reference plane; and
  calculating the estimated volume based on the fill weight of each bin and the mean height of each bin.

8. The method of 7, wherein calculating the estimated volume comprises:
  calculating an estimated volume of each bin by computing the product of (a) the fill weight of the bin, (b) the mean height of the 3D points of the bin, and (c) the common area of the bins of the 2D grid; and
  summing the estimated volume of each bin to compute the estimated volume of the object.

9. The method of any of 1-8, further comprising orienting the point cloud based on the reference plane.

10. The method of 9, wherein orienting the point cloud based on the reference plane comprises:
  determining a reference direction of the reference plane; and
  aligning an axis of a coordinate system of the 3D point cloud with the reference direction.

11. The method of 10, wherein aligning the axis of the coordinate system of the 3D point cloud to the reference direction of the reference plane comprises:
  determining a transform that maps the axis to the reference direction; and
  mapping, using the transform, the 3D points of the point cloud to the reference plane.

12. The method of 11,
  wherein the axis is a Z axis; and
  the method further comprises determining, for each bin, the height of the bin based on the Z axis value for each of the 3D points in the bin.

13. The method of any of 1-12, further comprising:
  receiving data indicative of a desired resolution of the estimated volume; and
  determining the length and width of the bins of the 2D grid based on the desired resolution.

14. A non-transitory computer-readable media comprising instructions that, when executed by one or more processors on a computing device, are operable to cause the one or more processors to determine an estimated volume of an object captured by a three-dimensional (3D) point cloud, comprising performing:
  receiving data indicative of:
   a 3D point cloud comprising a plurality of 3D points; and
   a reference plane in spatial relation to the 3D point cloud;
  configuring a 2D grid of bins along the reference plane, wherein each bin of the 2D grid comprises a length and width that extends along the reference plane;
  determining, for each bin of the 2D grid, a number of 3D points in the bin and a height of the bin from the reference plane; and
  calculating, based on the calculated number of 3D points in each bin and the height of each bin, an estimated volume of an object captured by the 3D point cloud.

15. The non-transitory computer-readable media of 14, wherein:
  determining the number of 3D points and height of each bin of the 2D grid comprises determining, for each bin of the 2D grid:
   a first number of 3D points in the bin on a first side of the reference plane; and
   a first height of the bin from the first side; and
  calculating the estimated volume of the object comprises calculating a first estimated volume of the object.

16. The non-transitory computer-readable media of any of 14-15, wherein determining the number of 3D points of each bin comprises ignoring 3D points of the plurality of 3D points within a threshold distance of the reference plane.

17. The non-transitory computer-readable media of any of 14-16, wherein calculating the estimated volume of the object based on the determined number of 3D points in each bin and the height of each bin comprises:
  calculating, based on the 3D points in each bin, a mean number of 3D points in the bins of the 2D grid.

18. The non-transitory computer-readable media of any of 14-17, wherein the instructions are further configured to cause the one or more processors to perform orienting the point cloud based on the reference plane.

19. The non-transitory computer-readable media of any of 14-18, wherein the instructions are further configured to cause the one or more processors to perform:
  receiving data indicative of a desired resolution of the estimated volume; and
  determining the length and width of the bins of the 2D grid based on the desired resolution.

20. A system comprising a memory storing instructions, and at least one processor configured to execute the instructions to determine an estimated volume of an object captured by a three-dimensional (3D) point cloud, comprising performing:
  receiving data indicative of:
   a 3D point cloud comprising a plurality of 3D points; and
   a reference plane in spatial relation to the 3D point cloud;
  configuring a 2D grid of bins along the reference plane, wherein each bin of the 2D grid comprises a length and width that extends along the reference plane;
  determining, for each bin of the 2D grid, a number of 3D points in the bin and a height of the bin from the reference plane; and
  calculating, based on the calculated number of 3D points in each bin and the height of each bin, an estimated volume of an object captured by the 3D point cloud.

The invention claimed is:

1. A computerized method for determining an estimated volume of an object captured by a three-dimensional (3D) point cloud, the method comprising:
  receiving a 3D point cloud comprising a plurality of 3D points and a reference plane in spatial relation to the 3D point cloud;
  configuring a 2D grid of bins along the reference plane, wherein each bin of the 2D grid comprises a length and width that extends along the reference plane;
  determining, for each bin of the 2D grid, a number of 3D points in the bin and heights of the 3D points in a reference direction from the reference plane, the reference direction perpendicular to the reference plane;
  determining a height of the bin in the reference direction from the reference plane based on the heights of the 3D points; and
  calculating, based on the determined number of 3D points in each bin and the height of each bin, an estimated volume of an object captured by the 3D point cloud.

2. The method of claim 1, wherein:
  determining the number of 3D points and height of each bin of the 2D grid comprises determining, for each bin of the 2D grid:
   a first number of 3D points in the bin on a first side of the reference plane; and
   a first height of the bin from the first side; and
  calculating the estimated volume of the object comprises calculating a first estimated volume of the object.

3. The method of claim 2, further comprising:
  determining, for each bin of the 2D grid:
   a second number of 3D points in the bin on a second side of the reference plane opposite the first side, and
   a second height of the bin from the second side; and
  calculating a second estimated volume of the object.

4. The method of claim 3, wherein calculating the estimated volume comprises adding the first estimated volume and the second estimated volume.

5. The method of claim 1, wherein determining the number of 3D points of each bin comprises ignoring 3D points of the plurality of 3D points within a threshold distance of the reference plane.

6. The method of claim 1, wherein calculating the estimated volume of the object based on the determined number of 3D points in each bin and the height of each bin comprises:
  calculating, based on the 3D points in each bin, a mean number of 3D points in the bins of the 2D grid.

7. The method of claim 6, further comprising:
  for each bin of the 2D grid:
   determining, based on a number of 3D points in the bin and the mean number of 3D points in the bins, a fill weight of the bin; and
   determining a mean height of the 3D points in the bin from the reference plane; and
  calculating the estimated volume based on the fill weight of each bin and the mean height of each bin.

8. The method of claim 7, wherein calculating the estimated volume comprises:
   calculating an estimated volume of each bin by computing the product of (a) the fill weight of the bin, (b) the mean height of the 3D points of the bin, and (c) the common area of the bins of the 2D grid; and
   summing the estimated volume of each bin to compute the estimated volume of the object.

9. The method of claim 1, further comprising orienting the point cloud based on the reference plane.

10. The method of claim 9, wherein orienting the point cloud based on the reference plane comprises:
    determining a reference direction of the reference plane; and
    aligning an axis of a coordinate system of the 3D point cloud with the reference direction.

11. The method of claim 10, wherein aligning the axis of the coordinate system of the 3D point cloud to the reference direction of the reference plane comprises:
    determining a transform that maps the axis to the reference direction; and
    mapping, using the transform, the 3D points of the point cloud to the reference plane.

12. The method of claim 11,
    wherein the axis is a Z axis; and
    the method further comprises determining, for each bin, the height of the bin based on the Z axis value for each of the 3D points in the bin.

13. The method of claim 1, further comprising:
    receiving data indicative of a desired resolution of the estimated volume; and
    determining the length and width of the bins of the 2D grid based on the desired resolution.

14. A non-transitory computer-readable media comprising instructions that, when executed by one or more processors on a computing device, are operable to cause the one or more processors to determine an estimated volume of an object captured by a three-dimensional (3D) point cloud, comprising performing:
    receiving a 3D point cloud comprising a plurality of 3D points and a reference plane in spatial relation to the 3D point cloud;
    configuring a 2D grid of bins along the reference plane, wherein each bin of the 2D grid comprises a length and width that extends along the reference plane;
    determining, for each bin of the 2D grid, a number of 3D points in the bin and heights of the 3D points in a reference direction from the reference plane, the reference direction perpendicular to the reference plane;
    determining a height of the bin in the reference direction from the reference plane based on the heights of the 3D points; and
    calculating, based on the determined number of 3D points in each bin and the height of each bin, an estimated volume of an object captured by the 3D point cloud.

15. The non-transitory computer-readable media of claim 14, wherein:
    determining the number of 3D points and height of each bin of the 2D grid comprises determining, for each bin of the 2D grid:
       a first number of 3D points in the bin on a first side of the reference plane; and
       a first height of the bin from the first side; and
    calculating the estimated volume of the object comprises calculating a first estimated volume of the object.

16. The non-transitory computer-readable media of claim 14, wherein determining the number of 3D points of each bin comprises ignoring 3D points of the plurality of 3D points within a threshold distance of the reference plane.

17. The non-transitory computer-readable media of claim 14, wherein calculating the estimated volume of the object based on the determined number of 3D points in each bin and the height of each bin comprises:
    calculating, based on the 3D points in each bin, a mean number of 3D points in the bins of the 2D grid.

18. The non-transitory computer-readable media of claim 14, wherein the instructions are further configured to cause the one or more processors to perform orienting the point cloud based on the reference plane.

19. The non-transitory computer-readable media of claim 14, wherein the instructions are further configured to cause the one or more processors to perform:
    receiving data indicative of a desired resolution of the estimated volume; and
    determining the length and width of the bins of the 2D grid based on the desired resolution.

20. A system comprising a memory storing instructions, and at least one processor configured to execute the instructions to determine an estimated volume of an object captured by a three-dimensional (3D) point cloud, comprising performing:
    receiving a 3D point cloud comprising a plurality of 3D points and a reference plane in spatial relation to the 3D point cloud;
    configuring a 2D grid of bins along the reference plane, wherein each bin of the 2D grid comprises a length and width that extends along the reference plane;
    determining, for each bin of the 2D grid, a number of 3D points in the bin and heights of the 3D points in a reference direction from the reference plane, the reference direction perpendicular to the reference plane;
    determining a height of the bin in the reference direction from the reference plane based on the heights of the 3D points; and
    calculating, based on the determined number of 3D points in each bin and the height of each bin, an estimated volume of an object captured by the 3D point cloud.

* * * * *